(No Model.)
C. E. HAGARTY.
PLASHING DEVICE.
No. 435,300. Patented Aug. 26, 1890.
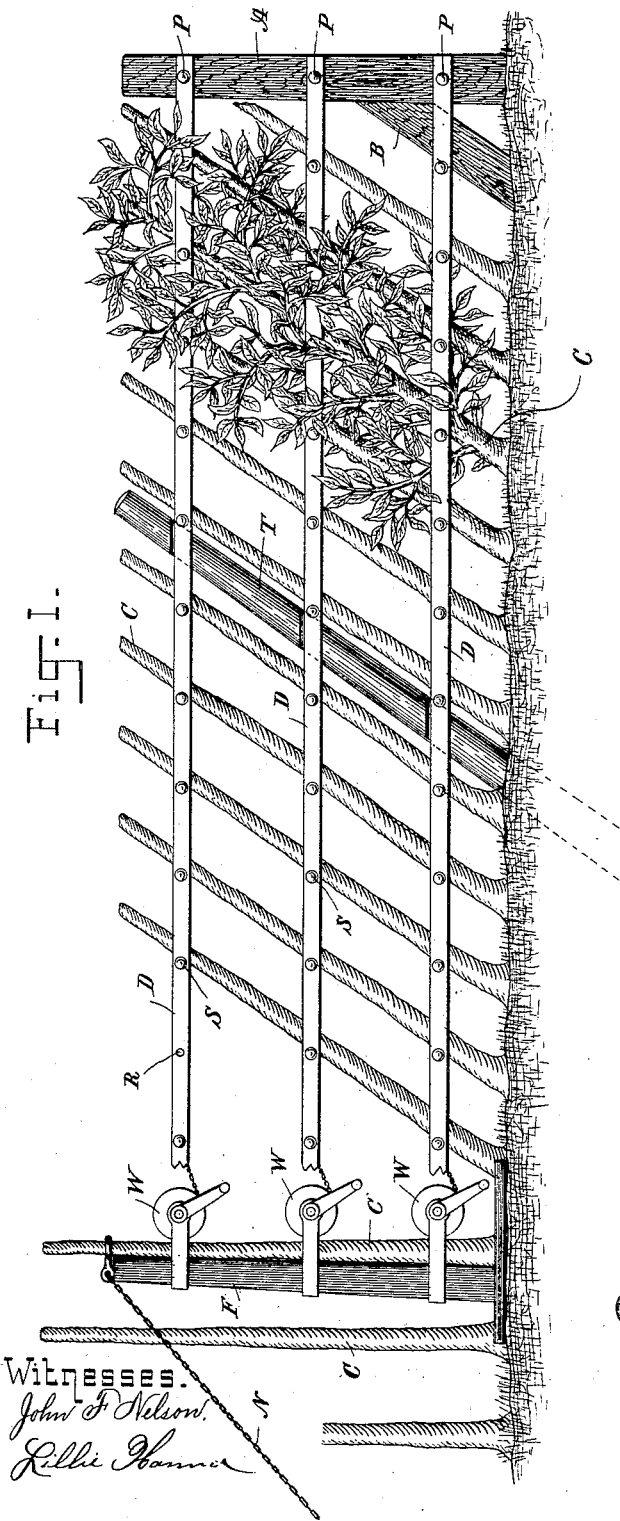
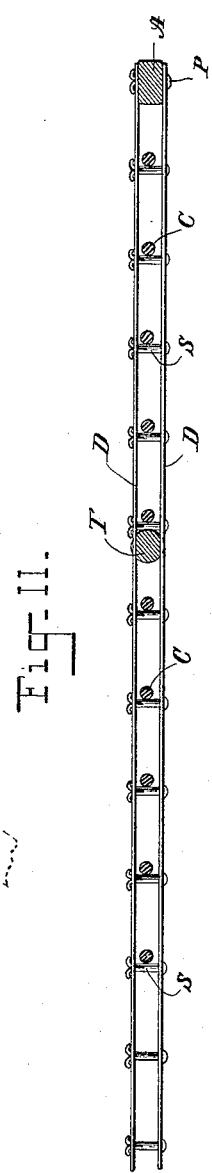
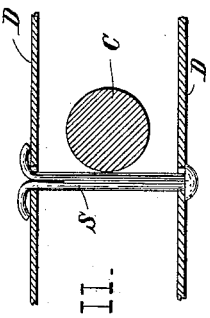
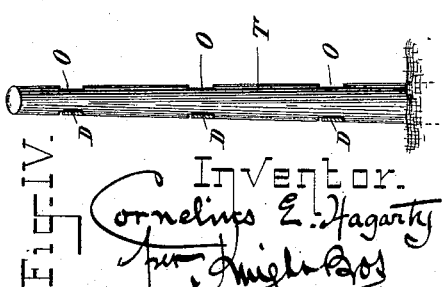
Witnesses.
John F Nelson
Lillie Hanna
Inventor.
Cornelius E. Hagarty

UNITED STATES PATENT OFFICE.

CORNELIUS E. HAGARTY, OF JAMAICA, NEW YORK.

PLASHING DEVICE.

SPECIFICATION forming part of Letters Patent No. 435,300, dated August 26, 1890.

Application filed April 12, 1890. Serial No. 347,705. (No model.)

*To all whom it may concern:*

Be it known that I, CORNELIUS E. HAGARTY, a citizen of the United States, residing at Jamaica, county of Queens, State of New York, have invented certain new and useful Improvements in Plashing Devices, of which the following is a specification.

This invention relates to certain improvements in plashing devices, and has to do more particularly with what is known as "plashed" hedges or "plashed" fences, the object being to produce a hedge that can be controlled as to size, dimensions, and direction, combining with it longitudinal braces and strengthening-wires arranged in the line of the hedge and so distributed that they can control the direction of the growth, as will be hereinafter described.

My particular invention in the present instance relates to the manner of constructing and arranging the longitudinal wires or bands and providing them with pins or stops which will hold the canes or stalks of the hedge in a predetermined position, and constructing the wires or bands in such a manner that the distance between the canes can be easily regulated and controlled.

My invention consists in novel features of construction, hereinafter described and claimed.

Referring to the accompanying drawings, which form a part of this specification, Figure I represents a side elévation showing the construction and arrangement of my improved plashing device. Fig. II is a plan view embodying my improvements. Fig. III is a detail view. Fig. IV is an end elevation of one of the posts employed by me.

In the drawings, A represents a terminal post set firmly in the ground to any suitable depth, and is provided with one or more braces B, which serve to retain the terminal post in the proper upright position.

At C, I show the canes or plants, preferably Osage orange; but any suitable hedge-plant may be employed. These canes are upset or bent forward, as shown in Fig. I, and are locked in the bent position by means of the longitudinal wires or bands D, which are fastened to the terminal posts A by means of pins P.

The longitudinal wires or bands are employed in pairs and are arranged opposite each other, as shown in Figs. II and III, so as to inclose and embrace the canes or plants between them, and in this manner secure the canes in the desired bent position without entailing the necessity of combining them, as has heretofore been done. I also perforate these flat wires or bands, as shown at R, Fig. I, the perforations being made to correspond and adapted to receive split pins S, which extend through both of the bands, and which are locked, as shown in Figs. II and III, by bending over the ends thereof in the opposite directions. These pins serve to retain the bands or wires together, and also serve as stops or locks to hold the canes or plants in the desired position. At T, I show posts, which are inserted preferably at an angle, as represented in Fig. I, and which support the wires or bands and take up the lateral strain. The pins also are inserted just outside of these posts and lock the bands and the posts together, the posts being provided with openings O at their sides, so as to afford seating for the bands or wires. This construction is shown in Fig. IV. Usual temporary or shiftable posts are provided, one of which is shown at F at the left-hand side of the drawings, and is held to an upright position by the stay-chain N. Winches or reels W are provided for retaining the bands or wires in the proper horizontal position while being adjusted and the pins are being inserted.

Having thus described my invention, the following is what I claim as new therein, and desire to secure by Letters Patent:

A plashing device consisting of the terminal post A, brace B, paired longitudinal wires or bands D, having perforations R, pins P, by which the wires or bands are secured to the terminal post, the split pins S, inclined post T, having side openings O, shiftable post F, and reels W, substantially as described.

CORNELIUS E. HAGARTY.

Witnesses:
HERBERT WRIGHT,
M. V. BIDGOOD.